(12) United States Patent
Martin

(10) Patent No.: US 7,886,627 B2
(45) Date of Patent: Feb. 15, 2011

(54) COUPLING DEVICE AND TRANSMISSION SYSTEM INCLUDING THE COUPLING DEVICE

(75) Inventor: William Wesley Martin, Milton Keynes (GB)

(73) Assignee: Zeroshift Limited, Milton Keynes (GB)

( * ) Notice: Subject to any disclaimer, the term of this patent is extended or adjusted under 35 U.S.C. 154(b) by 1016 days.

(21) Appl. No.: 10/568,920

(22) PCT Filed: Sep. 16, 2004

(86) PCT No.: PCT/GB2004/003960

§ 371 (c)(1),
(2), (4) Date: Jan. 4, 2007

(87) PCT Pub. No.: WO2005/026570

PCT Pub. Date: Mar. 24, 2005

(65) Prior Publication Data

US 2008/0093570 A1  Apr. 24, 2008

(30) Foreign Application Priority Data

Sep. 18, 2003  (GB) .................................. 0321824.5

(51) Int. Cl.
*F16H 59/00* (2006.01)
*F16H 3/38* (2006.01)
*F16D 27/08* (2006.01)
*F16D 19/00* (2006.01)

(52) U.S. Cl. .................. 74/335; 74/339; 192/48.2; 192/84.31

(58) Field of Classification Search .................. 74/333, 74/335, 339, 355, 365; 192/48.2, 84.2, 84.21, 192/84.31, 84.92, 84.961

See application file for complete search history.

(56) References Cited

U.S. PATENT DOCUMENTS 2,314,042 A    3/1943   Haigh
2,611,886 A *  9/1952   Mathis ......................... 318/15
2,969,134 A *  1/1961   Wiedmann et al. ....... 192/84.92

(Continued)

FOREIGN PATENT DOCUMENTS

DE       607 182 C    12/1934

(Continued)

OTHER PUBLICATIONS

Jost, *A different Automatic*, AEI Journal, pp. 32-34, 36, (2003).

*Primary Examiner*—Roger Pang
*Assistant Examiner*—David D Le
(74) *Attorney, Agent, or Firm*—Knobbe, Martens, Olson & Bear, LLP

(57) ABSTRACT

A coupling device for coupling rotatable bodies together includes first and second rotatable bodies, a plurality of coupling members for selectively coupling the first and second rotatable bodies together to transfer drive between the rotatable bodies, and an electro-magnetic actuator for controlling engagement of the coupling members. The coupling device can be incorporated into a transmission system, which includes first and second drive shafts, first and second gear sets mounted on the shafts for transferring drive between the shafts, a selector for selectively transferring drive between the first shaft and either the first or second gear set, and an electro magnetic actuator for controlling engagement of the engagement members and the drive formations.

22 Claims, 10 Drawing Sheets

U.S. PATENT DOCUMENTS

| | | | |
|---|---|---|---|
| 3,327,822 A | 6/1967 | Spencer | |
| 3,780,840 A | 12/1973 | Thomas | |
| 3,872,737 A | 3/1975 | Thomas | |
| 3,903,738 A | 9/1975 | Malchow | |
| 4,098,380 A | 7/1978 | Thomas | |
| 4,274,523 A | 6/1981 | Sigg | |
| 4,328,719 A | 5/1982 | Manna | |
| 5,765,671 A * | 6/1998 | Endo et al. | 192/48.2 |
| 5,802,915 A * | 9/1998 | Organek et al. | 74/331 |
| 5,827,148 A * | 10/1998 | Seto et al. | 477/15 |
| 6,251,043 B1 | 6/2001 | Gierling | |
| 7,261,379 B2 | 8/2007 | Volker et al. | |
| 2002/0134637 A1 | 9/2002 | Salecker et al. | |
| 2003/0010144 A1 | 1/2003 | Petzold | |
| 2003/0084739 A1 | 5/2003 | Koerber et al. | |

FOREIGN PATENT DOCUMENTS

| | | |
|---|---|---|
| DE | 1450177 | 4/1970 |
| DE | 2324881 | 5/1973 |
| DE | 19835334 | 8/1998 |
| DE | 10037401 | 2/2002 |
| EP | 029711 | 6/1981 |
| EP | 0584457 | 9/1995 |
| EP | 0 809 049 A | 11/1997 |
| EP | 1460305 | 9/2004 |
| FR | 2312693 | 12/1976 |
| FR | 2 583 489 A | 12/1986 |
| FR | 2810713 | 12/2001 |
| GB | 2100812 | 1/1983 |
| GB | 2159897 | 12/1985 |
| GB | 2319817 | 6/1998 |
| GB | 2320531 | 6/1998 |
| WO | WO 01/29440 | 4/2001 |
| WO | WO 03/078198 | 9/2003 |
| WO | WO 2004/099654 | 11/2004 |
| WO | WO 2005/005868 | 1/2005 |
| WO | WO 2005/005869 | 1/2005 |
| WO | WO 2005/024261 | 3/2005 |
| WO | WO 2005/026570 | 3/2005 |

* cited by examiner

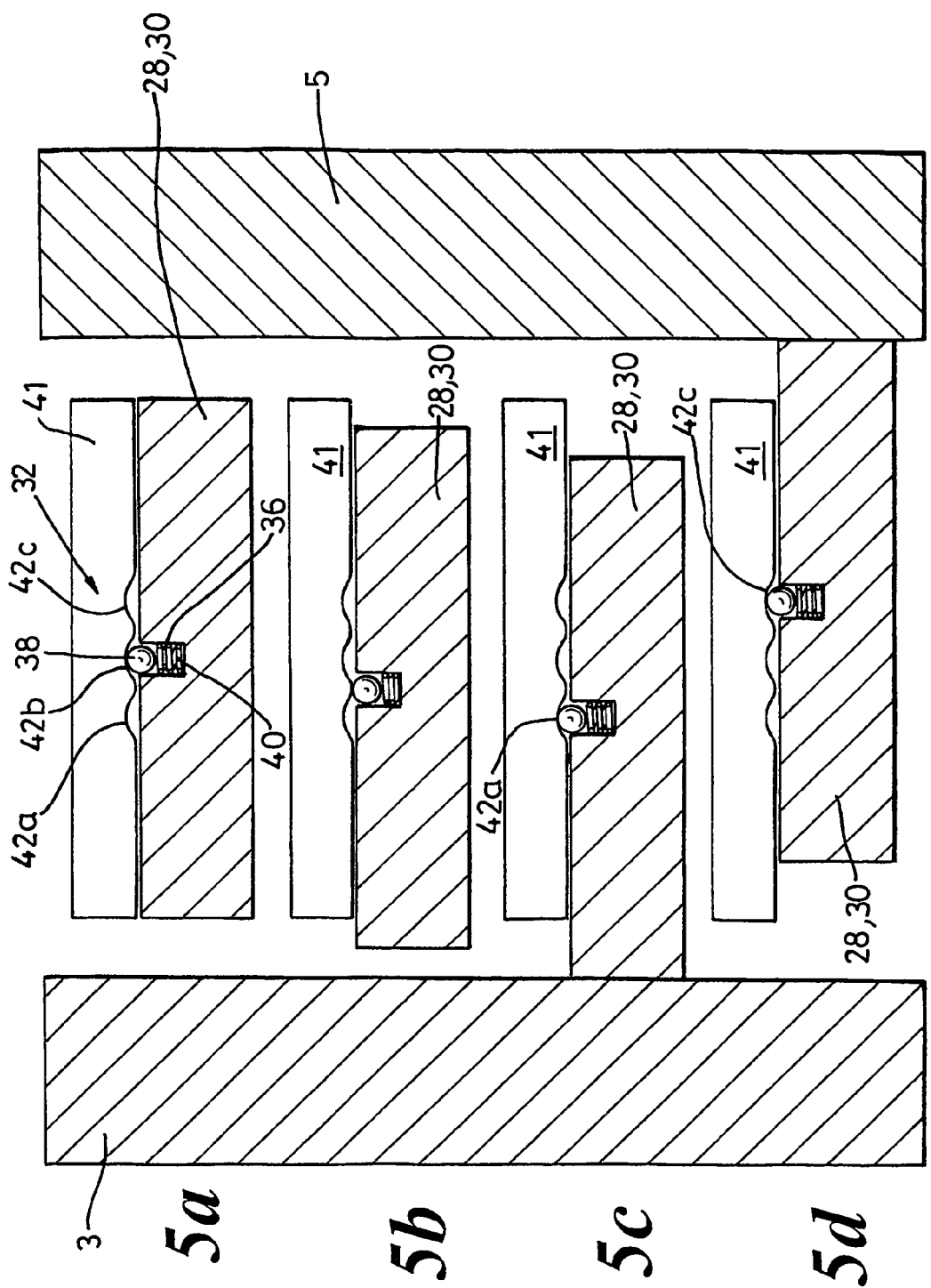

US 7,886,627 B2

COUPLING DEVICE AND TRANSMISSION SYSTEM INCLUDING THE COUPLING DEVICE

CROSS-REFERENCE TO RELATED APPLICATIONS

This application is the U.S. National Phase filing under 35 U.S.C. §371 of PCT/GB2004/003960, filed Sep. 16, 2004, which designated the United States and was published in English, which claims priority to Great Britain Patent Application No. 0321824.5, filed Sep. 18, 2003.

BACKGROUND OF THE INVENTION

1. Field of the Invention

The present invention relates to an electromagnetically operable coupling device for coupling rotatable bodies and a transmission system including such a coupling device.

2. Description of Related Art

In machines where there are first and second rotatable bodies that can be selectively disconnected or connected together to transfer drive between them, actuation of the coupling device is typically achieved using a mechanical switching arrangement for example using a series of interconnected levers and shafts or use of a hydraulic system. For example, a conventional manual dog transmission system as typically used in motor sport may use a gear lever to select a new gear. The gear lever is connected to a shaft that in turn is connected to a fork; The fork moves a dog ring into and out of engagement with gear wheels mounted on a shaft to select between gear ratios. Alternatively, the system may include a hydraulic circuit for actuating the fork or an electro-mechanical system that uses electric motors to move the fork in response to a gear selection made by operating an electrical switch.

A mechanical actuator arrangement is used in the instantaneous transmission system described in PCT/GB2004/001976. In that system, a gear lever is connected to a shaft and two forks are mounted on the shaft. The forks are arranged to actuate a pair of disc springs to operate two engagement bar sets to selectively engage two gear wheels.

SUMMARY OF THE INVENTION

The present invention seeks to provide a coupling device for coupling rotatable bodies together that includes an alternative actuator arrangement to existing arrangements, and a transmission system including the coupling device, and in particular a coupling system that can be electronically controlled.

According to a first aspect of the invention there is provided a coupling device including first and second rotatable bodies, a plurality of coupling members for selectively coupling the first and second rotatable bodies together to transfer drive between the rotatable bodies, and electro-magnetic actuator means for controlling engagement of the coupling members.

Advantageously the invention can be used in conjunction with the transmission systems described in PCT/GB2004/001976, PCT/GB2004/002946, PCT/GB2004/003021, PCT/GB2004/002955, PCT/GB2004/003794 the contents of which are hereby incorporated by reference, or in a conventional dog transmission system. Furthermore, the invention can be used to couple first and second rotatable bodies together in any suitable machine. For example, the invention can be used in mining equipment, marine equipment, the oil and gas industries, aerospace applications, manufacturing equipment, pumps, and in any vehicle having a transmission system.

The coupling device can be fully integrated into a fully automatic or semi-automatic electronic control system. For example, a fully automatic system could be arranged to make a gear change without the intervention of the driver when some predetermined conditions occur. A semi-automatic system could use an electronic control system to activate the actuator in response to a driver selecting a new gear via a switch or mechanical input device.

Advantageously the electro-magnetic actuator means includes at least one magnetic field generator for producing a controllable magnetic field and at least one magnetic element. Preferably the electro-magnetic actuator means includes a plurality of magnetic field generators for producing a plurality of controllable magnetic fields and the electro-magnetic actuator means includes a plurality magnetic elements. For example, the or each magnetic field generator may comprise at least one coil of electrically conducting materially that is electrically connected to a circuit arranged to energise the or each coil. The or each magnetic element may comprise at least one permanent magnet, the arrangement being such that, in use, the or each magnetic field generated by the magnetic element(s) interacts with the or each controllable magnetic field to control engagement of the coupling members. The or each magnetic element may alternatively be arranged to have a variable magnetic field.

Preferably the electro-magnetic actuator means includes an electrical control circuit having at least one capacitor arranged to energise the or each magnetic field generator.

Advantageously the electro-magnetic actuator means can be arranged to move at least one of the coupling members axially into engagement with at least one other coupling member.

The coupling members may include at least one drive formation associated with each of the rotatable bodies. For example, the coupling members can include a plurality of drive formations with at least one drive formation being associated with each rotatable body. At least one of the rotatable bodies can be moved axially towards the other rotatable body by the electro-magnetic actuator means so that the drive formations can selectively engage each other thereby coupling the rotatable bodies together to transmit drive there between. Preferably the coupling members include a plurality of engagement members wherein the electro-magnetic actuator means is arranged to control the movement of the engagement members to selectively engage at least one drive formation associated with each rotatable body to couple the rotatable bodies together.

The coupling members may include at least one drive formation associated with one of the rotatable bodies and at least one engagement member associated with the other rotatable body wherein the electro-magnetic actuator means is arranged to control the movement of the or each engagement member to selectively engage the or each drive formation to couple the rotatable bodies together. Preferably one of the rotatable bodies is a shaft and the or each engagement member is mounted on the shaft for rotation therewith.

The coupling members may include first and second sets of engagement members that are moveable into and out of engagement with at least one of the rotatable bodies independently of each other. The electro-magnetic actuator means may include first and second magnetic field generators, wherein each magnetic field generator is arranged to control movement of one of the sets of engagement members.

Advantageously the coupling device may include means for maintaining the or each engagement member in at least one predetermined position. Preferably the means for maintaining the or each engagement member in at least one predetermined position includes at least one mechanical device, such as a detent. Advantageously the means for maintaining the or each engagement member in at least one predetermined position can be arranged to maintain the or each engagement member in at least one of a neutral position, in engagement with the first rotatable body, or in engagement with the second rotatable body.

According to another aspect of the invention there is provided a transmission system including first and second drive shafts, first and second gear sets mounted on the shafts for transferring drive between the shafts, each gear set including a first gear wheel mounted on the first shaft for rotation relative to the first shaft said first gear wheel having a plurality of drive formations, and a second gear mounted on the second shaft for rotation with the second shaft, selector means for selectively transferring drive between the first shaft and either the first or second gear set including a plurality of engagement members for engaging the drive formations, and electro-magnetic actuator means for controlling engagement of the engagement members and the drive formations.

Advantageously the electro-magnetic actuator means includes at least one magnetic field generator for producing a controllable magnetic field and at least one magnetic element. Preferably the electro-magnetic actuator means includes a plurality of magnetic field generators for producing a plurality of controllable magnetic fields and the electro-magnetic actuator means includes a plurality of magnetic elements. For example, the or each magnetic field generator may comprise at least one coil of electrically conducting materially that is electrically connected to a circuit arranged to energise the or each coil. The or each magnetic element may comprise at least one permanent magnet, the arrangement being such that, in use, the or each magnetic field emitted by the magnetic element(s) interacts with the or each controllable magnetic field to control engagement of the engagement members and the drive formations.

Advantageously the electro-magnetic actuator means may include an electrical control circuit having at least one capacitor arranged to energise the or each magnetic field generator.

Advantageously the electro-magnetic actuator means can be arranged to move at least one of the coupling members axially into engagement with at least one other coupling member.

Advantageously the transmission system may include means for maintaining the or each engagement member in at least one predetermined position. Preferably the means for maintaining the or each engagement member in at least one predetermined position includes at least one mechanical device, such as a detent. Preferably the means for maintaining the or each engagement member in at least one predetermined position is arranged to maintain the or each engagement member in at least one of a neutral position, in engagement with at least one of the first gear wheels.

Preferably the selector means includes first and second sets of engagement members that are moveable into and out of engagement with the first gear wheels independently of each other, said selector means being arranged such that when a driving force is transmitted, one of the first and second sets of engagement members drivingly engages the engaged gear wheel, and the other set of engagement members is then in an unloaded condition. The electro-magnetic actuator means can be arranged to move the unloaded set of engagement members into driving engagement with the unengaged gear wheel to effect a gear change. The selector means can be arranged such that when a braking force is transmitted the first set of engagement members drivingly engages the engaged gear wheel, and the second set of engagement-members is in an unloaded condition, and when a driving force is transmitted the second set of engagement members drivingly engages the engaged gear wheel, and the second set of engagement members is then in an unloaded condition.

The electro-magnetic actuator means can be arranged to control movement of the first and second sets of engagement members substantially independently. For example, each set of engagement members includes at least one magnetic element and the electro-magnetic actuator means includes first and second magnetic field generators that are each arranged to control movement of one of the sets of engagement members.

Preferably the electro-magnetic actuator means is arranged to bias the loaded set of engagement members towards the unengaged gear wheel without disengaging the loaded set of engagement members from the engaged gear wheel.

Preferably the first and second sets of engagement members are arranged to rotate, in use, with the first shaft. The selector means is arranged such that the first and second sets of engagement members can move axially relative to each other along the first shaft. The first and second sets of engagement members are axially aligned when both sets engage the first gear wheels.

An embodiment of the present invention will now be described, by way of example only, with reference to the accompanying drawings in which like references indicate equivalent features, wherein:

BRIEF DESCRIPTION OF THE DRAWINGS

FIGS. 5a-d illustrate diagrammatically the arrangement and operation of a detent used to maintain the engagement bars in predetermined positions;

DETAILED DESCRIPTION OF THE INVENTION

Figure 1:
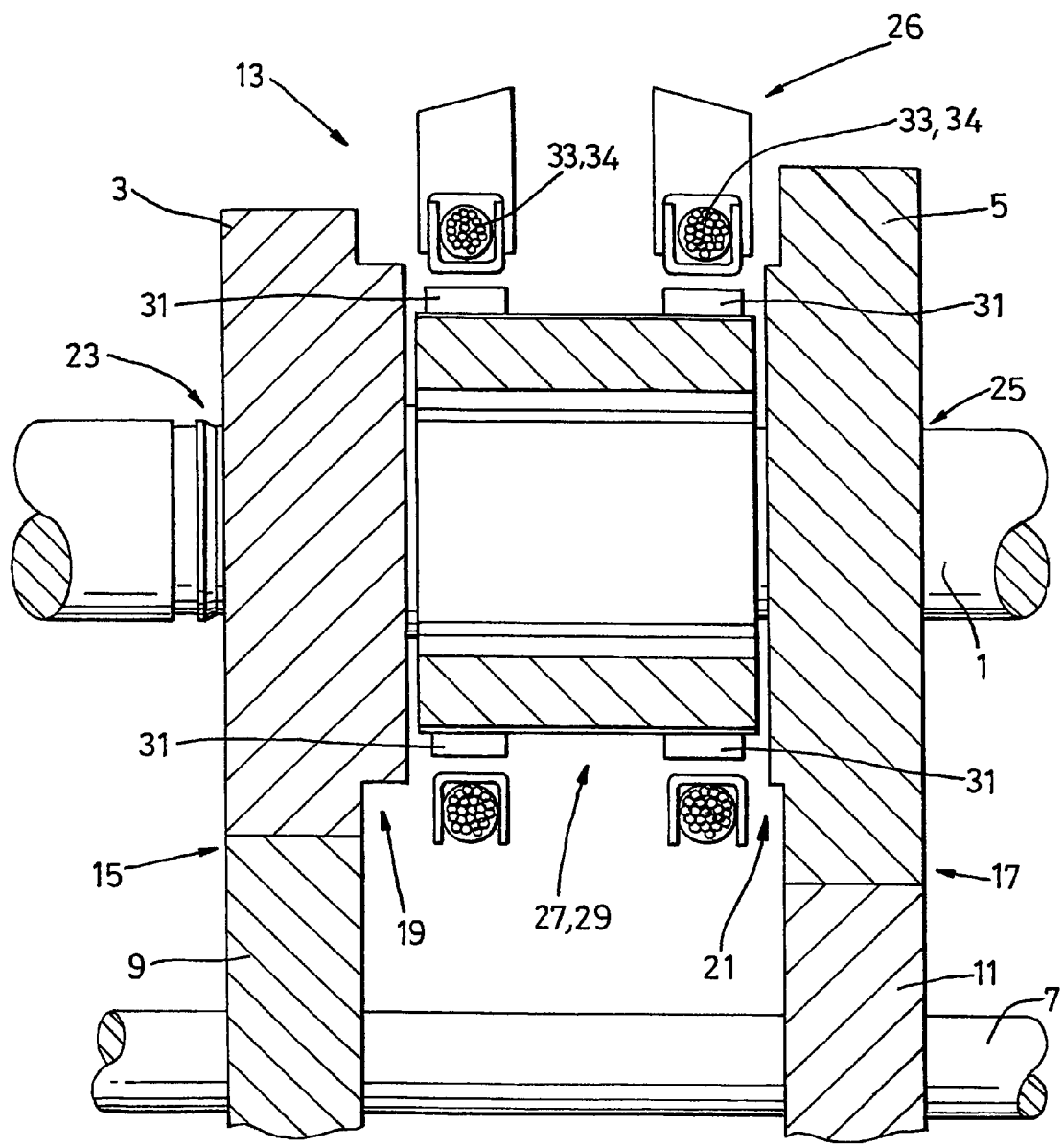
FIG. 1 is a sectional general arrangement of part of a transmission system in accordance with a first embodiment of the invention.

FIG. 1 shows a transmission system that includes a coupling device that is actuated by electromagnetic actuator means in accordance with an embodiment of the invention. The transmission system comprises an output shaft 1 having first and second gear wheels 3,5 mounted thereon, an input shaft 7 having third and fourth gear wheels 9,11 mounted thereon and a selector assembly 13. The first and second gear wheels 3,5 are rotatably mounted on the output shaft 1 and the third and fourth gear wheels 9,11 are fixedly mounted on the input shaft 7. The first and second gear wheels 3,5 mesh with third and fourth gear wheels 9,11 respectively to form first and second gear wheel pairs 15,17.

Rotational drive may be transferred from input shaft 7 to the output shaft 1 via either the first or second gear wheel pairs 15,17, with selection of the operative gear wheel pair being determined by the position of the selector assembly 13. The selector assembly 13 engages first and second groups of drive formations 19,21 located on the first and second gear wheels 3,5 respectively. The drive formations each comprise a group of dogs.

Figure 3:
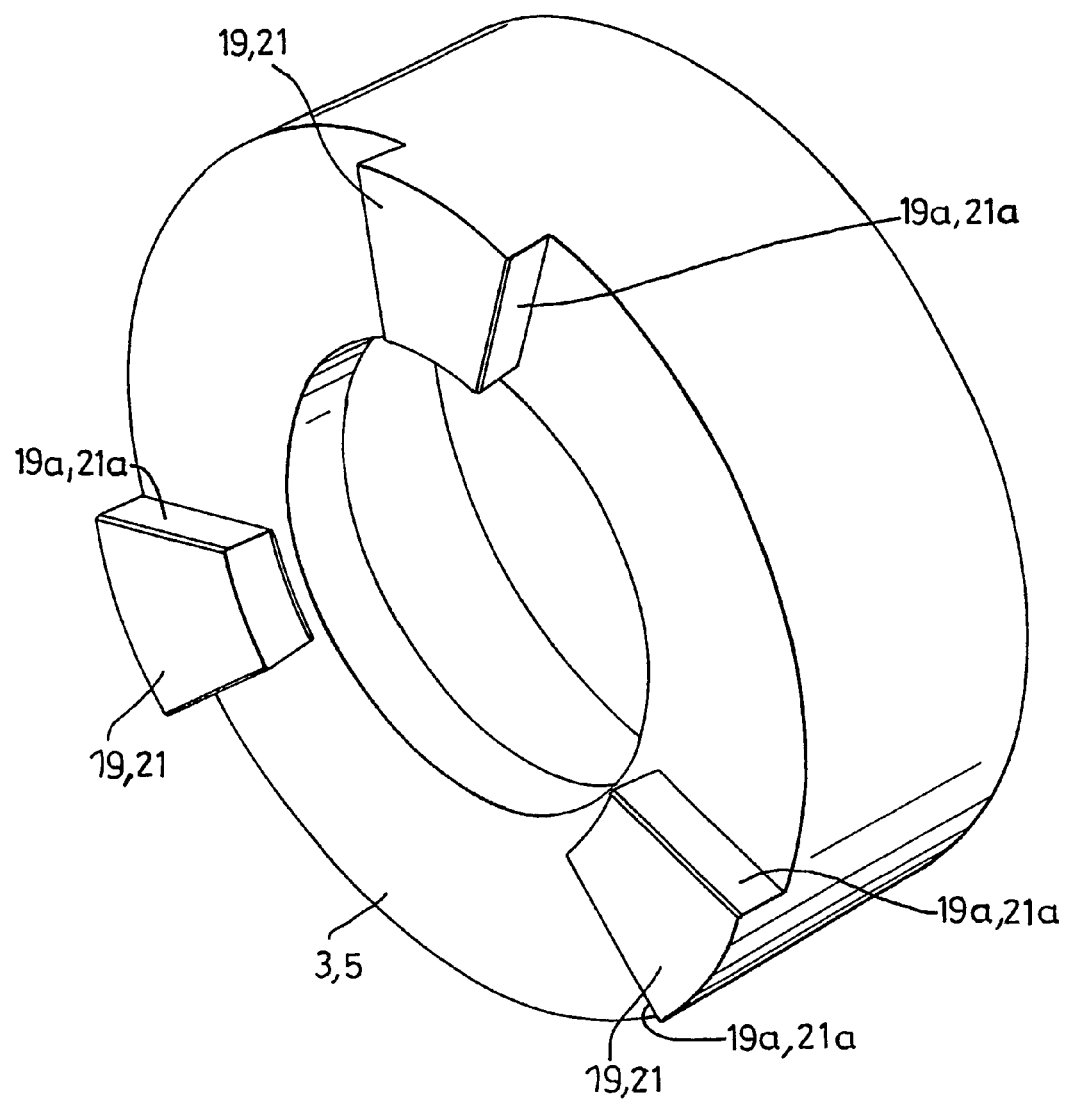
FIG. 3 shows the arrangement of a group of dogs on a gear wheel (gear wheel teeth omitted for clarity)

The first dog group 19 is located on one side of the first gear wheel 3. This is shown in FIG. 3 wherein the gear teeth of the gear wheel have been omitted for clarity. The dogs are preferably formed integrally with the first gear wheel, but this is not essential. The first dog group 19 comprises three dogs evenly distributed about the gear face, i.e. the angle subtended between the centres of a pair of dogs is approximately 120°. The sides 19a of the dogs are planar and may be formed with a retention angle. The second dog group 21 comprises three dogs and is similarly arranged to the first gear wheel on one side of the second gear wheel 5. This is shown in FIG. 3. Three dogs are used because the spaces between the dogs this arrangement provide large engagement windows to receive the selector assembly 13. Large engagement windows provide greater opportunities for the selector assembly to fully engage the gear wheels 3,5 before transmitting drive thereto or being driven therefrom. If the selector assembly 13 drives a gear wheel when only partially engaged it can lead to damage of the dogs and/or the selector assembly 13.

The first and second gear wheels 3,5 are mounted spaced apart on the output shaft 1 on roller bearings 23,25 and are arranged such that the sides including the first and second dog groups 19,21 face each other.

The selector assembly 13 includes first and second sets of engagement bars 27,29 and an actuator assembly 26 in the form at least one electromagnetic field generator 33 including a coil 34 electrically connected to at least one circuit.

The first and second sets of engagement bars 27,29 are mounted on the output shaft 1 between the first and second gear wheels 3,5. The first set of engagement bars 27 comprises three bars 28 that are evenly distributed about the output shaft 1 such that their bases face inwards, and the axes of the bars 28 are substantially parallel. The second set of engagement bars 29 comprises three bars 30 which are similarly arranged about the output shaft 1.

Figure 2:
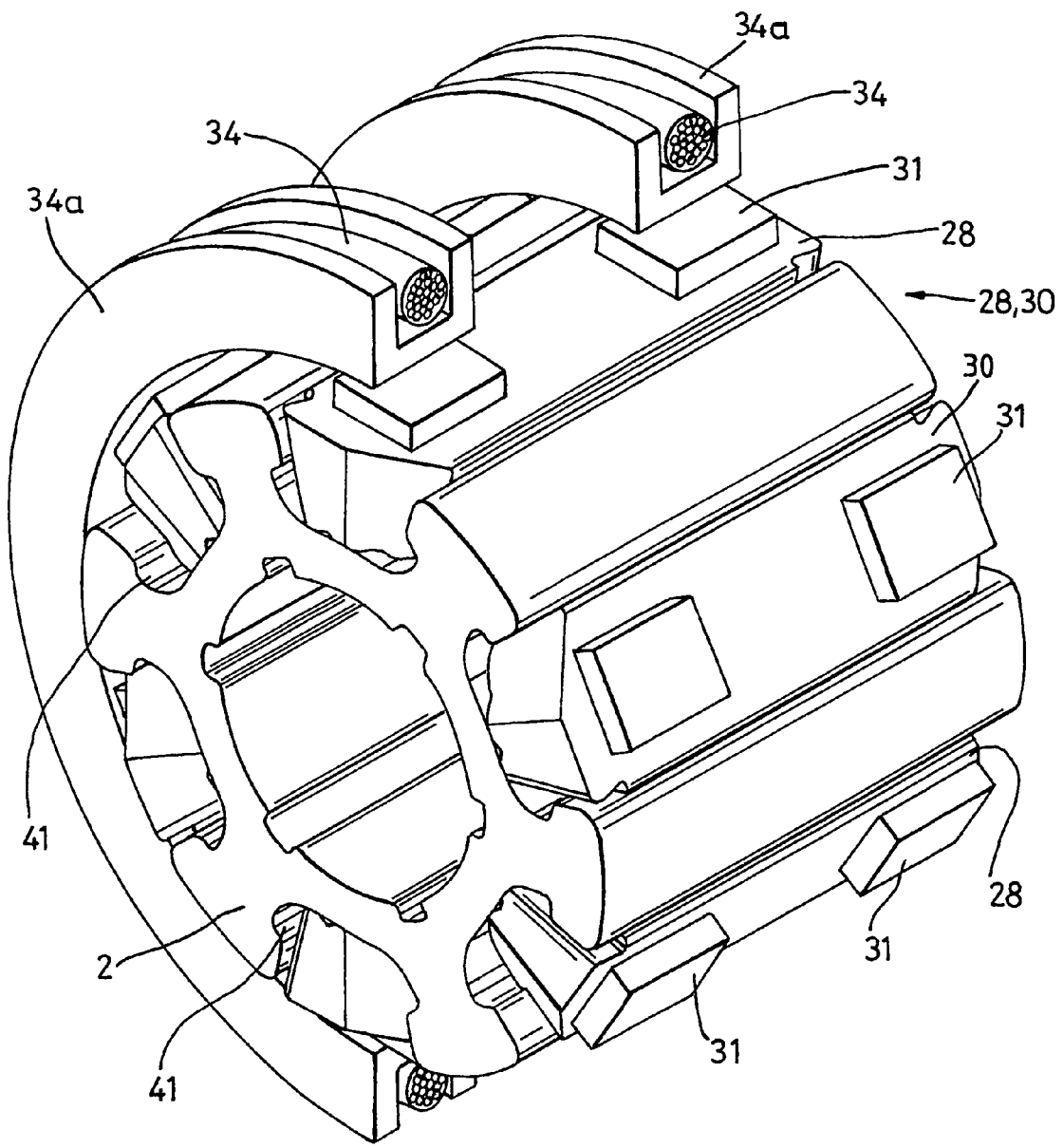
FIG. 2 is a perspective view of a selector assembly including electro-magnetic means for generating a magnetic field—the electro-magnetic means are partially cut away for clarity.

The first and second engagement bar sets 27,29 are mounted on a sleeve 2 which is mounted on the output shaft 1 between the first and second gear wheels 3,5 (see FIG. 2). The sets of engagement bars 27,29 are arranged to rotate with the output shaft 1 but are able to slide axially along the sleeve 2 and the output shaft 1 in response to a switching action of the actuator assembly 26. To facilitate this, the sleeve 2 includes six keyways 41 formed in its curved surface with each engagement bar 28,30 having a complementary formation in its base. The keyways 41 have substantially T-shaped profiles such that the bars are radially and tangentially (but not axially) restrained within the keyways 41. Alternatively, the keyways 41 can have slotted or dovetailed profiles to radially restrain the bars.

The arrangement of the bar sets 27,29 is such that bars of a particular set are located in alternate keyways 41 and the bar sets 27,29 can slide along the sleeve 2. Each bar set 27,29 moves as a unit and each bar set can move independently of the other.

Figure 7:
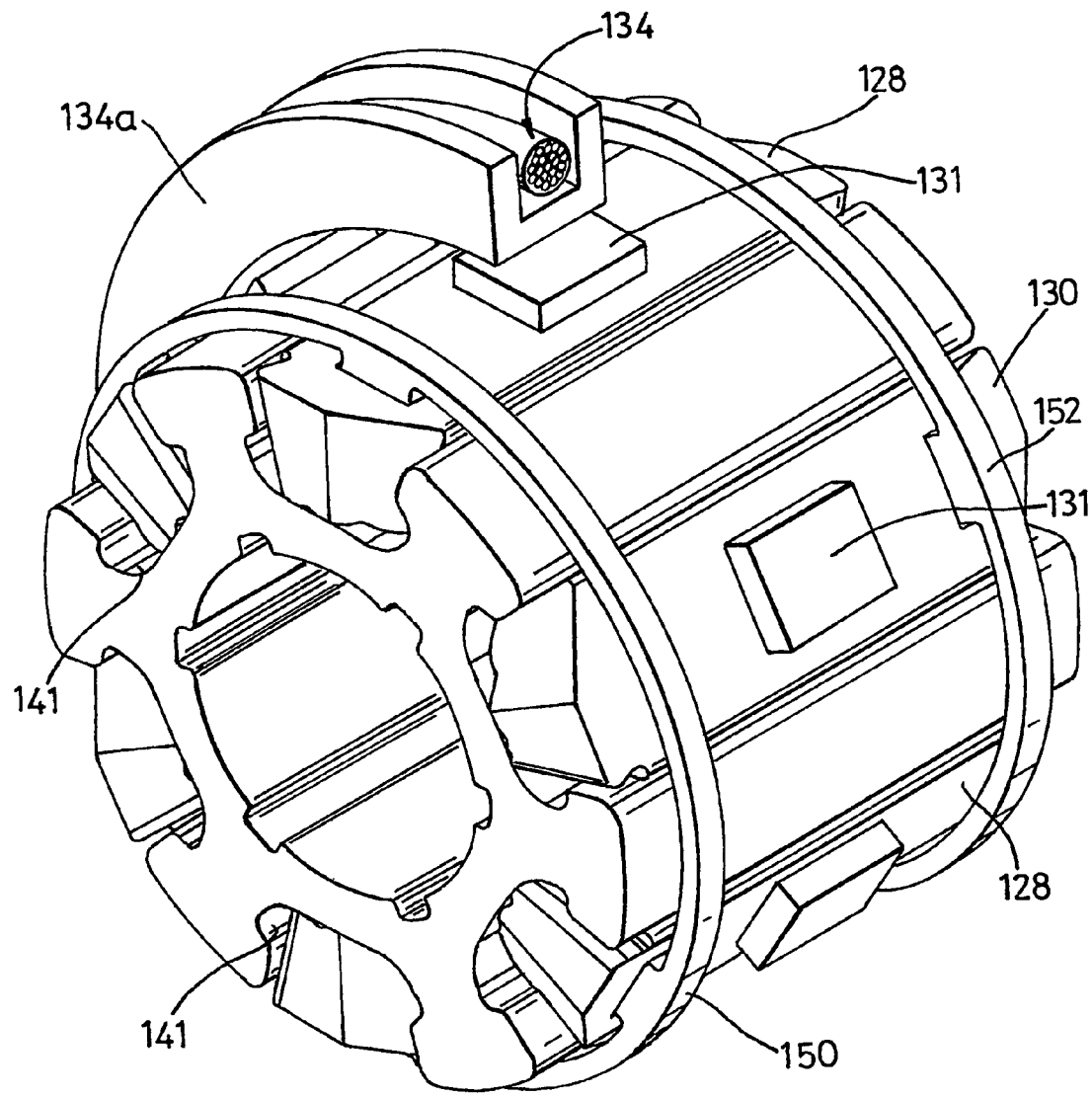
FIG. 7 shows a second embodiment of the invention.

Optionally, the bars 28 in the first bar set may be joined together by a first connector ring 150 and the bars 30 in the second bar set may be joined together by a second connector ring 152, for example using inwardly extending arms that engage with recesses formed in the upper surfaces of the engagement bars (see FIG. 7). Although the rings are shown on the diagram of the third embodiment, they may be used in conjunction with each embodiment. Each bar set 27,29 moves as a unit and each bar set can move independently of the other. When there is relative movement between the first and second sets of bars 27,29, the second connector ring 152 slides over the first set of bars 27 and the first connector ring 150 slides over the second set of bars 29.

Preferably the bars are configured to be close to the output shaft 1 to prevent significant cantilever effects due to large radial distances of loaded areas thus reducing the potential for structural failure.

Figure 4:
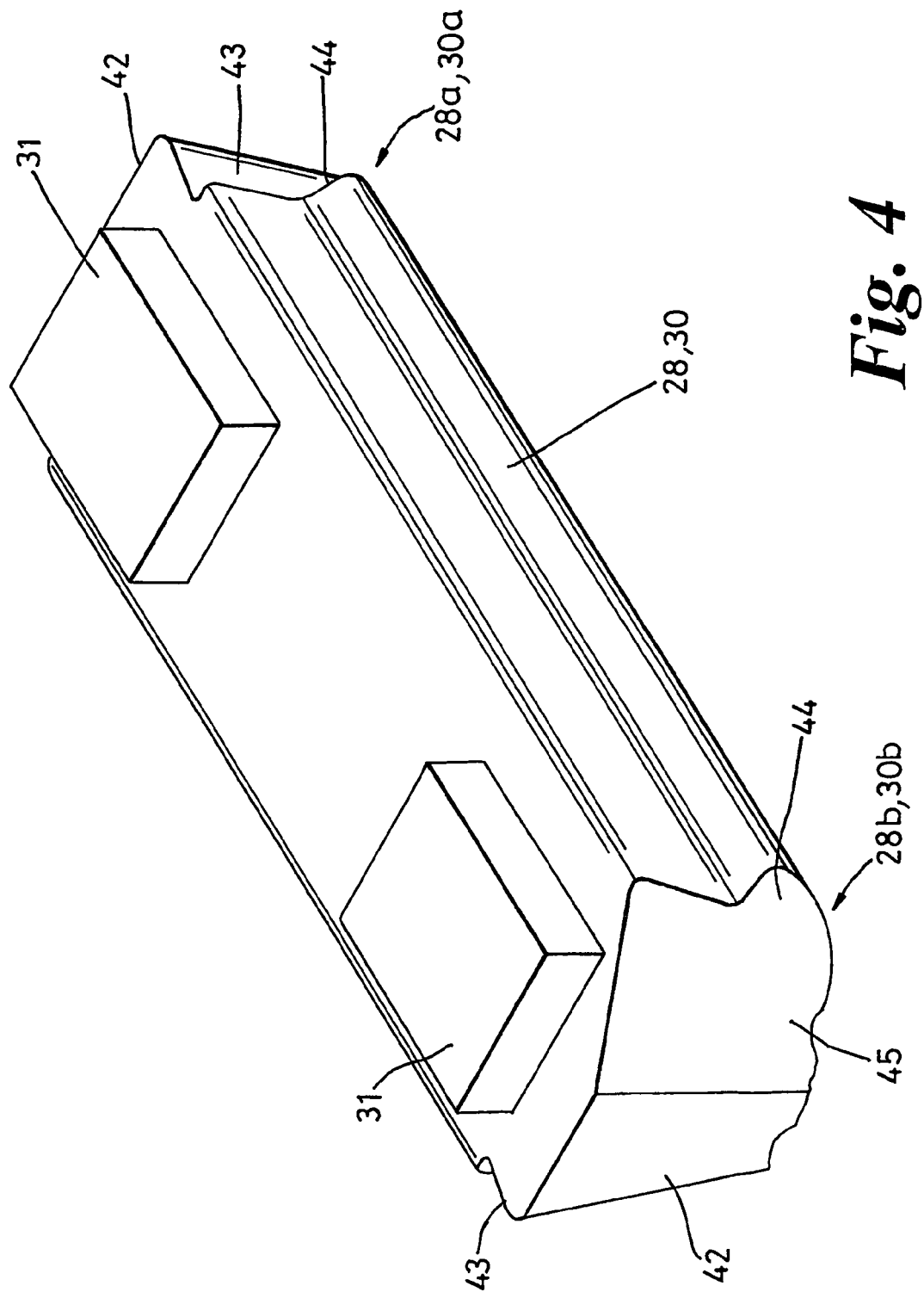
FIG. 4 is a perspective view of an engagement bar.

Each bar 28 in the first bar set 27 has a first end 28a arranged to engage the first group of dogs 19 attached to the first gear wheel 3 and a second end 28b arranged to engage the second group of dogs 21 on the second gear wheel 5 (see FIG. 4). The first and second ends 28a,28b typically have the same configuration but are opposite handed, such that the first end 28a is arranged to engage the first group of dogs 19 during deceleration of the first gear wheel 3 and the second end 28b is arranged to engage the second group of dogs 21 during acceleration of the second gear wheel 5, for example during engine braking in automotive applications. Each bar 30 in the second bar set 29 is similarly arranged, except that the first end 30a is arranged to engage the first group of dogs 19 during acceleration of the first gear wheel 3 and the second end 30b is arranged to engage the second group of dogs 21 during deceleration of the second gear wheel 5.

When both the first and second sets of engagement bars 27,29 engage a gear wheel drive is transmitted from the input shaft 7 to the output shaft 1 whether the gear is accelerating or decelerating.

The first and second ends 28a,30a,28b,30b of the bar each include an engagement face 43 for engaging the dogs 19,21 (not shown), a ramp 45, an end face 42 and a shoulder 44 (see FIG. 4). The end faces 42 limit the axial movement of the engagement bars 28,30 by abutting the sides of the gear wheels. The engagement faces 43 are angled to complement to the sides of the dogs 19a,21a so that as the engagement bars 28,30 rotate into engagement therewith there is face-to-face contact to reduce wear. Each ramp 45 is helically formed and slopes away from the end face 42. The angle of inclination of the ramp 45 is such that the longitudinal distance between the edge of the ramp furthest from the end face 42 and the plane of the end face 42 is larger than the height of the dogs 19,21. This ensures that the transmission does not lock up when there is relative rotational movement between the engagement bars 28,30 and the dogs 19,21 that causes the ramp 45 to move towards engagement with the dogs 28,30. The dogs 19,21 do not crash into the sides of the engagement bars 28,30 but rather engage the ramps 45. As further relative rotational movement between the dogs 19,21 and the engagement bars 28,30 occurs, the dogs 19,21 slide across the ramps 45 and the helical surfaces of the ramps cause the engagement bars 28,30 to move axially along the output shaft 1 away from the dogs 19,21 so that the transmission does not lockup.

When the bars of the first and second sets 27,29 are interleaved, as in FIG. 2, the engagement faces 43 of the first ends 28a of the first set of bars 27 are adjacent the engagement faces 43 of the first end 30a of the second set of bars 29. When the first and second sets of bars 27,29 are fully engaged with a gear a dog is located between each pair of adjacent engagement faces 43. The dimensions of the dogs 19,21 and the ends of the bars are preferably such that there is little movement of each dog between the engagement face 43 of the acceleration bar and the engagement face 43 of the deceleration bar when the gear moves from acceleration to deceleration, or vice versa, to ensure that there is little or no backlash in the gear.

The electromagnetic field generator 33 comprises two coils 34 of copper wire that are mounted in annular supports 34a that extend around the shaft 1 without contacting it and therefore do not rotate with the output shaft 1. Each coil 34 comprises a multiplicity of turns, of copper wire. This is shown diagrammatically in FIGS. 1 and 2 where the number of turns illustrated in not intended to represent an exact number of wires. The number of turns in the wire will be dependent upon the application and the strength of the magnetic field required. The annular supports 34a are attached to the transmission housing and are shown with a cut-away section for clarity in FIG. 2. Each coil 34 is electrically connected to a circuit, which includes a capacitor, timer and a switch. The circuits are connected to a common power source such as a cell, and preferably to the cell or cells used to power other vehicle electrical systems. The circuits are arranged such that current flow through the coils 34 is reversible.

Each engagement bar 28,30 includes two permanent magnets 31 (see FIG. 4), such as natural magnets, located centrally on its upper (outer surface). Preferably the north poles of the magnets 31 point towards one end of the engagement bar 28,30 and the south poles point towards the other end, and the bars 28,30 are located in the keyways 41 such that the north poles of each magnet 31 point towards one of the gear wheels and the south poles point to the other gear wheel. However other arrangements are possible.

When one of the circuits is activated one of the coils 34 is energised thereby generating at least one controllable magnetic field that interacts with the magnetic fields of the permanent magnets 31 to either urge the engagement bars 28,30 in one or the other axial directions, thereby controlling movement of the bars within the keyways 41. The circuits are arranged such that current can flow in either direction through the coils 34. The engagement bars 28,30 are thus biased to move within the keyways 41 towards one of the gear wheels. The direction of movement is determined by the direction of the magnetic fields generated, which is determined by the direction of current flowing through the coil 34 and the orientations of the permanent magnets 31. The magnitude of the force acting on the engagement bars 28,30 is determined by the strength of the magnetic field generated by the coil 34 which can be controlled by controlling the amount of current flowing through the coil 34. When the other circuit is activated the other coil 34 is energised and likewise controls movement of the engagement bars 28,30.

Figure 4A:
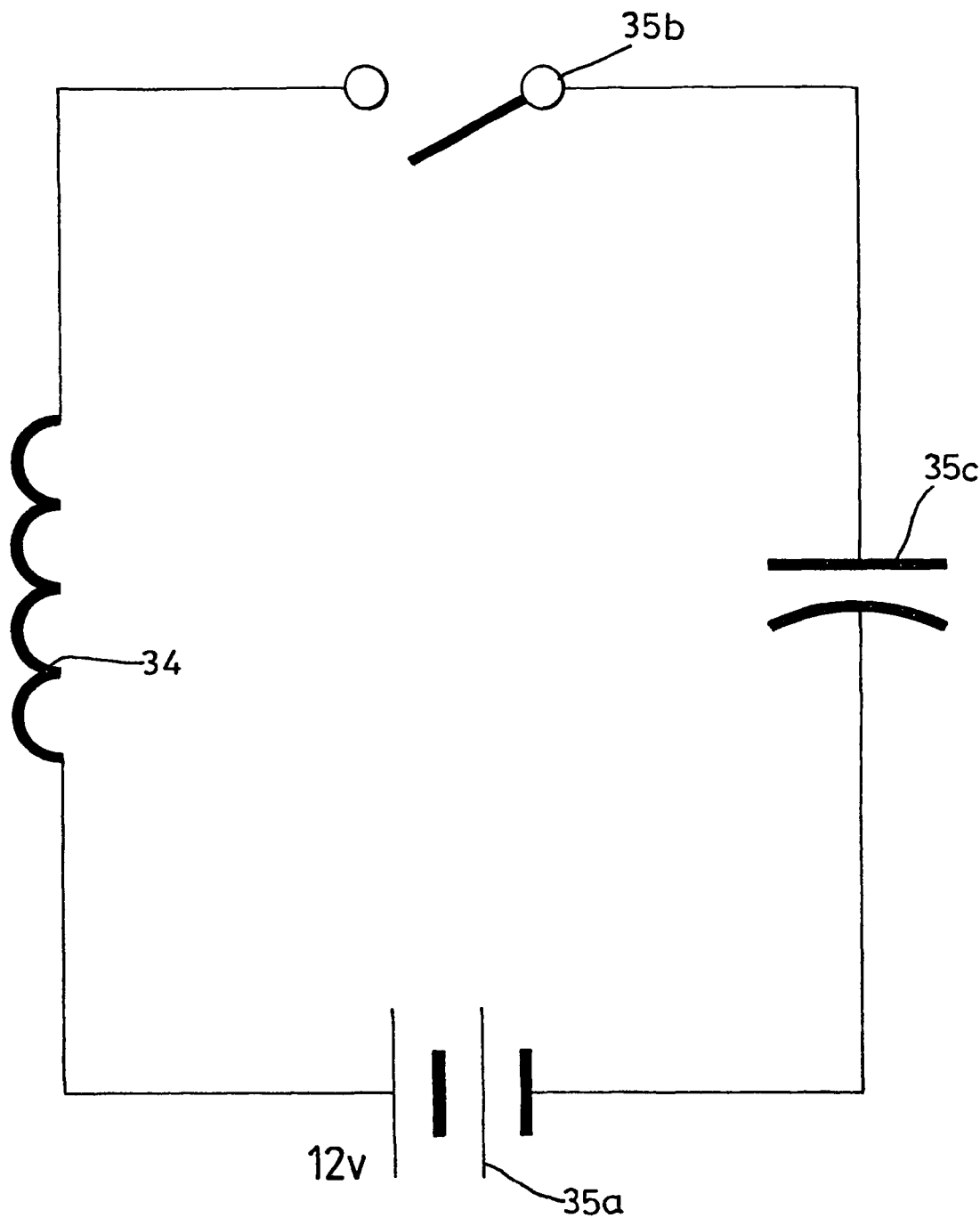
FIG. 4a is a circuit diagram for energising the electromagnetic means.

The circuits can be arranged to energise the coils 34 in response to a gear change such that they remain energised until both bar sets have moved into engagement with a gear wheel. Alternatively, one of the coils 34 can be energised a first time to move one of the bar sets into engagement with the gear wheel and a second time to move the other bar set into engagement with the gear wheel, wherein the coils 34 are not energised in the intervening period. The coils 34 may also be energised such that one of the coils 34 moves the engagement bars 28,30 into and out of engagement with one of the gear wheels 3,5 and the other coil 34 moves the engagement bars 28,30 into and out of engagement with another gear wheel. In this case, it is not necessary to reverse the current in the coils 34 since each coil 34 will move the engagement bars 28,30 in a single direction and therefore a simplified control circuit can be used such as that shown in FIG. 4a which includes a cell 35a, a switch 35b, coil 34 and a capacitor 35c. Alternatively, both coils 34 can be energised simultaneously or sequentially to move the bars 28,30 in the keyways 41. When either coil 34 is energised the magnetic field produced interacts with the magnetic fields emitted by the permanent magnets 31 located on the bar sets 27,29. However, the bar sets will only be able to move within the keyways 41 if they are in an unloaded condition. If a bar set is in a loaded condition, it will be urged to move along the keyways 41 but will be unable to move because it is drivingly engaged with a gear wheel.

Detents 32 are located in recesses 36 in the inner side of each engagement bar (see FIGS. 5a-d). Each detent 36 includes a steel ball 38 and a spring 40. The spring 40 acts upon the ball 38 to bias it against the keyway 41. Each keyway 41 includes three depressions 42a-c formed in its upper surface that are arranged to engage with the ball 38 to locate and hold the engagement bars 28,30 in particular predetermined positions within the keyways 41. One of the depressions 42b is located centrally along the keyway 41 and the other two are located either side of the central depression 42b substantially axially aligned therewith. When the detents 36 engage with the central depressions 42b the engagement bars 28,30 are held in neutral positions, i.e. are not engaged with either of the first or second gear wheels 3,5. To move the engagement bars 28,30 into the neutral positions one of the coils 34 can be energised to move the bars towards the neutral positions and the other coil 34 can be energised to arrest the movement of the bars and allow the detents 36 to fully engage and hold the engagement bars 28,30. To move the engagement bars 28,30 out of their neutral positions, at least one of the coils 34 is energised to produce sufficient force to overcome the frictional resistance between the detent 36 and the depression 42b. Alternatively, after the coil 34 has been energised to move the engagement bars 28,30 towards the neutral position, the current in the coil can be reversed to halt movement of the bars.

The other depressions 42a,42c are similarly arranged to hold the engagements bars 28,30 in axial positions along the keyways 41 where they fully engage with the first and second gear wheels 3,5 respectively. This is illustrated diagrammatically in FIGS. 5a-d. The main purpose of the detents 36 is to obviate the need to continuously energise the coil 34 to hold the engagement bars 28,30 in contact with the gear wheels 3,5, or in the neutral position. The coils 34 are energised to move the engagement bars 28,30 within the keyways 41 and the detents 36 provide sufficient resistance to prevent the bars 28,30 from moving away from those positions when engaged with the depressions 42a-c. This leads to a more efficient actuator system.

Each depression 42a-c includes sloping sides. The sloping sides interact with the balls 38 and the resiliency of the springs 36 to move the engagement bars 28,30 into the correct positions. As the engagement bars 28,30 move towards the correct positions within the keyways 41 under the action of the magnetic field, the interaction between the detents 36 and the sloping sides of the depressions 42a-c pull the engagement bars 28,30 into the correct location.

In use, three of the bars are loaded and three are not loaded when both bar sets are fully engaged with a gear wheel. When a gear change is made, at least one of the coils 34 is energised to produce a magnetic field that biases the engagement bars 28,30 towards the unengaged gear wheel. The force acting upon the engagement bars 28,30 moves the three unloaded bars out of engagement with the engaged gear wheel, leaving the three loaded bars still in engagement. The unloaded bars move along the keyways 41 due to the interaction of the magnetic field of the permanent magnets 31 and the magnet field generated by the coils 34 until they engage the new gear wheel and the detent engages the depressions that are associated with the new gear wheel. When the unloaded bars have engaged with the new gear wheel, the remaining three bars disengage from the original gear wheel. At least one of the coils 34 is energised by the circuit and the remaining bars move within the keyways 41 towards the new gear wheel due to the interaction of magnetic fields until they engage the new gear wheel and the detents 36 engage the appropriate depressions.

This configuration provides a highly compact arrangement.

The operation of the selector assembly 13 will now be described with reference to FIGS. 6a-6f which for clarity illustrate diagrammatically the movement of the first and second bar sets 27,29 by the relative positions of only one bar from each set.

Figure 6A:
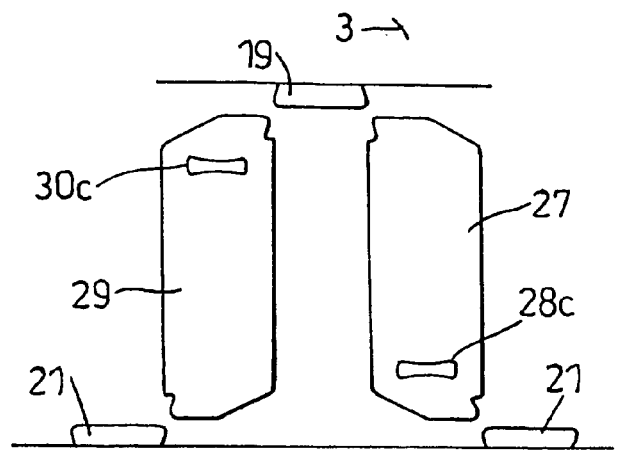
FIGS. 6a-f illustrate diagrammatically operation of the selector assembly.
Figure 6B:
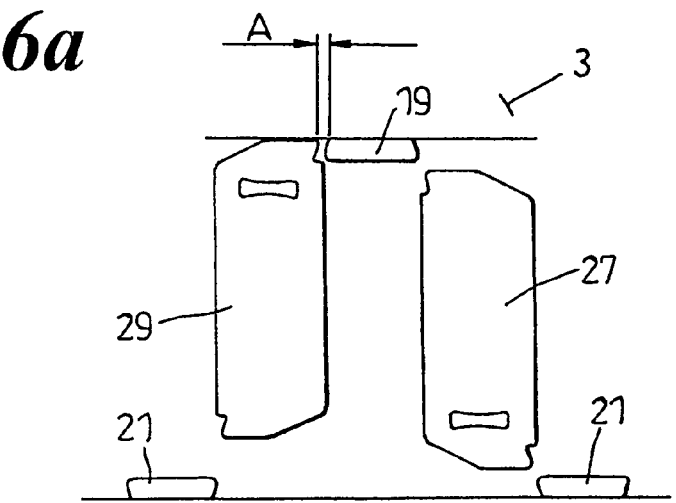

FIG. 6a shows the first and second bar sets 27,29 in a neutral position, that is, neither bar set is engaged with a gear wheel. FIG. 6b shows the first and second bar sets moving into engagement with the first gear wheel 3 under the action of the magnetic field generated by the coil 34 (not shown in FIG. 6b).

Figure 6C:
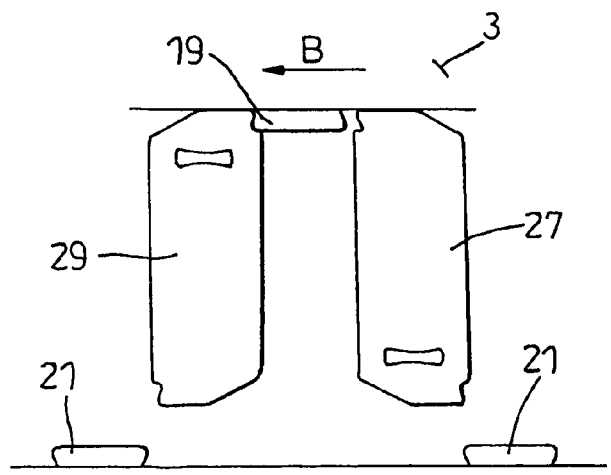
Figure 6D:
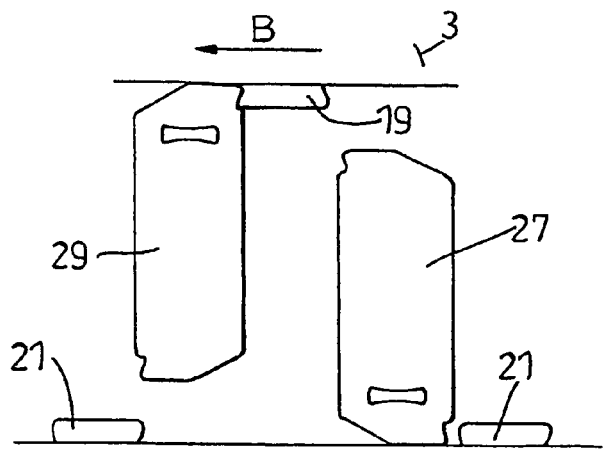
Figure 6E:
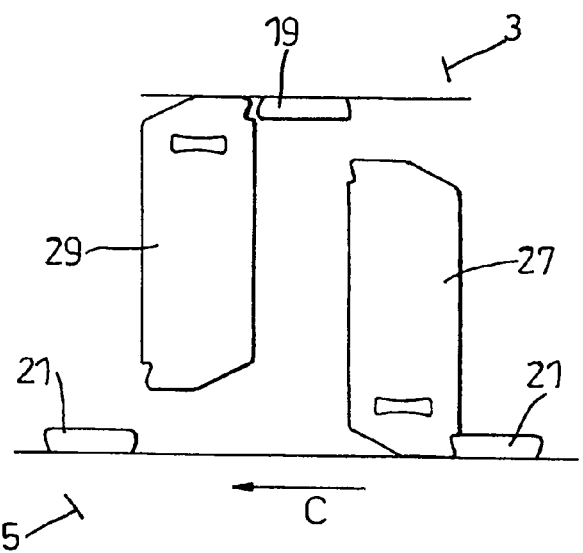
Figure 6F:
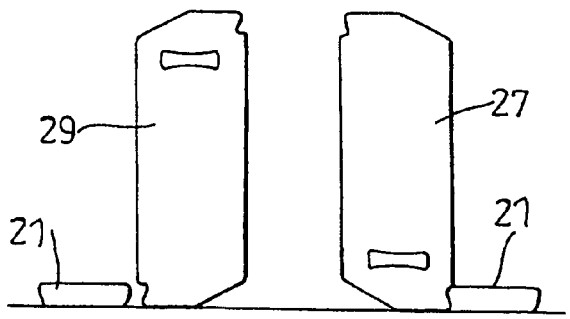

FIG. 6c shows a condition when the first gear wheel 3 is fully engaged, that is, the bars 28,30 are interleaved with the first group of dogs 19. The detents 36 are engaged with depressions 42a (not shown) so that the first and second bar sets 27,29 are held in engagement with the first gear wheel 3. Accordingly, power is transferred to the output shaft 7 from the first gear wheel 3 by the first bar set 27 when decelerating and the second bar set 29 when accelerating via the first group of dogs 19. Power is transmitted from the input shaft 7 via the third gear wheel 9.

Whilst accelerating (first gear wheel 3 rotating in the direction of arrow B in FIG. 6c) using the first gear wheel pair 15, the engagement faces 43 of the bars of the first bar set 27 are not loaded, whilst the engagement faces 43 of the bars of the second bar set 29 are loaded. When a user, or an engine management system (not shown) wishes to engage the second gear wheel pair 17, the circuit is activated thereby energising at least one of the coils 34 and generating a magnetic field that causes the bars of the first bar set 27 to slide axially along the keyways 41 in the sleeve 2 thereby disengaging the bars from the first gear wheel 3 and the detents 36 from the depressions 42a (see FIG. 6d—depressions not shown).

The magnetic field generated biases the bars of the second bar set 29 to move towards the second gear wheel 5. However, because the bars 30 of the second bar set 29 are loaded, i.e. are driven by the first gear wheel 3, they cannot disengage from the first gear wheel 3, and therefore the bars of the second bar set 29 remain stationary. At this stage the circuit either continuously energises at least one of the coils 34 to bias the bars 30 of the second bar set 29 towards the second gear wheel 5 or can be arranged to switch off the coil 34.

When the bars of the first bar set 27 slide axially along the output shaft 1 they engage the dogs 21. The bars are then driven by the second gear wheel 5 in the direction of Arrow C in FIG. 6e and energy is transmitted to the output shaft 1 from the input shaft 7 by way of the second gear wheel pair 17. As this occurs, the bars of the second bar set 29 cease to be loaded, and are free to disengage from the first group of dogs 19. If at least one of the coils 34 is arranged to be continuously energised throughout the gear change, the bars 30 of the second bar set 29 slide axially along the keyways 41 as soon as they become unloaded thereby completing disengagement of the first gear wheel 3 from the output shaft 1. If both coils 34 are deactivated after the first bar set 27 has engaged the second gear wheel 5 then the circuit energises at least one of the coils 34 to move the second bar set out of engagement with the first gear wheel 3. In either case, the bars of the second bar set 29 slide along the keyways 41 in the sleeve 2 until they engage the second gear wheel 5 and the detents 36 engage the depressions 42c, thereby completing engagement of the second gear wheel 5 with the output shaft 1 (see FIG. 6f). This method of selecting gear wheel pairs substantially eliminates torque interruption since the second gear wheel pair 17 is engaged before the first gear wheel pair 15 is disengaged, thus momentarily, the first and second gear wheel pairs 15,17 are simultaneously engaged.

When a gear wheel is engaged by both the first and second bar sets 27,29 it is possible to accelerate or decelerate using a gear wheel pair with very little backlash occurring when switching between the two conditions. Backlash is the lost motion experienced when the dog moves from the engagement face 43 of the acceleration bar to the engagement face 43 of the deceleration bar when moving from acceleration to deceleration, or vice versa. A conventional dog-type transmission system has approximately 30 degrees of backlash. A typical transmission system for a car in accordance with the current invention has backlash of less than four degrees.

Backlash is reduced by minimising the clearance required between an engagement member and a dog during a gearshift: that is, the clearance between the dog and the following engagement member (see measurement 'A' in FIG. 6b). The clearance between the dog and the following engagement member is in the range 0.5 mm-0.03 mm and is typically less than 0.2 mm. Backlash is also a function of the retention angle, that is, the angle of the engagement face 43, which is the same as the angle of the undercut on the engagement face of the dog. The retention angle influences whether there is relative movement between the dog and the engagement face 43. The smaller the retention angle, the less backlash that is experienced. The retention angle is typically between 2.5 and 15 degrees, and preferably is 15 degrees.

Transition from the second gear wheel pair 17 to the first gear wheel pair 15 whilst decelerating is achieved by a similar process.

Whilst decelerating in the second gear wheel pair 17 the engagement surfaces 43 of the bars of the first bar set 27 are not loaded, whilst the engagement surfaces 43 of the bars of the second bar set 29 are loaded. When a user, or an engine management system (not shown) wishes to engage the first gear wheel pair 15, the circuit is activated thereby energising at least one of the coils 34 and generating a magnetic field that causes the bars of the first bar set 27 to slide axially along the keyways 41 in the sleeve 2 thereby disengaging the bars from the second gear wheel 5 and the detents 36 from the depressions 42c (see FIG. 6d—depressions not shown).

Since the bars of the second bar set 29 are loaded, i.e. they are drivingly engaged with the dogs 21 on the second gear wheel, the second bar set 29 remains stationary, however the magnetic field biases the second bar set 29 towards the first gear wheel 3. At this stage the circuit either continuously energises at least one of the coils 34 to bias the bars 30 of the second bar set 29 towards the first gear wheel 3 or can be arranged to switch off the coils 34.

When the bars of the first bar set 27 slide axially in the keyways 41 they engage the dogs 19. The bars 28 are driven by the first gear wheel 3 such that energy is transmitted from the input shaft 7 to the output shaft 1 by way of the first gear wheel pair 15. As this occurs, the bars 30 of the second bar set 29 cease to be loaded. If at least one of the coils 34 is arranged to be continuously energised throughout the gear change, the bars 30 of the second bar set 29 slide axially along the keyways 41 as soon as they become unloaded thereby completing disengagement of the second gear wheel 5, from the output shaft 1. If both coils 34 are deactivated after the first bar, set 27 has engaged the first gear wheel 3 then the circuit energises at least one of the coils 34 for a second time to move the second bar set out of engagement with the second gear wheel 5. In either case, the bars of the second bar set 29 slide along the keyways 41 in the sleeve 2 until they engage the first gear wheel 3 and the detents 36 engage the depressions 42*a*, thereby completing engagement of the first gear wheel 3 with the output shaft 1.

Kick-down shifts, that is a gear shift from a higher gear to a lower gear but where acceleration takes place, for example when a vehicle is travelling up a hill and the driver selects a lower gear to accelerate up the hill, may have a brief torque interruption to allow disengagement prior to the shift.

A plurality of selector assemblies can be mounted on the output shaft with corresponding pairs of gear wheels to provide a larger number of gear ratios between the output shaft and the input shaft. It is also possible to have transmission systems with more than two shafts to provide additional gear ratios.

Use of the transmission system leads to improved performance, lower fuel consumption and lower emissions since drive interruption has substantially been eliminated. Also the system is a more compact design than conventional gearboxes leading to a reduction in gearbox weight.

It will be appreciated by the skilled person that various modifications can be made to the above embodiments that are within the scope of the current invention, for example the coils 34 for generating the electromagnetic filed can be wound in various ways to provide different magnetic field characteristics to control the movement of the engagement bars 28,30 in predetermined ways. It will also be appreciated that any practicable number of coils 34 and permanent magnets 31 can be used. For example, a single coil 134 can be used with a single permanent magnet 131 as shown in FIG. 7. The coil 134 is mounted in an annular support member 134*a* that is shown in part in FIG. 7 for clarity. Each magnet 131 is located centrally on each engagement bar 128,130 with its north pole oriented towards one end of the bar and its south pole oriented towards the other end of the bar. The engagement bars 128,130 are located in keyways 141 are the bars 128 of the first bar set are connected by a first connector ring 150 and the bars 130 of the second bar set are connected by a second connector ring 152. The arrangement is such that the north poles point towards one of the gear wheels and the south poles to the other gear wheel. The operation of this embodiment is similar to the embodiment described above.

Figure 8:
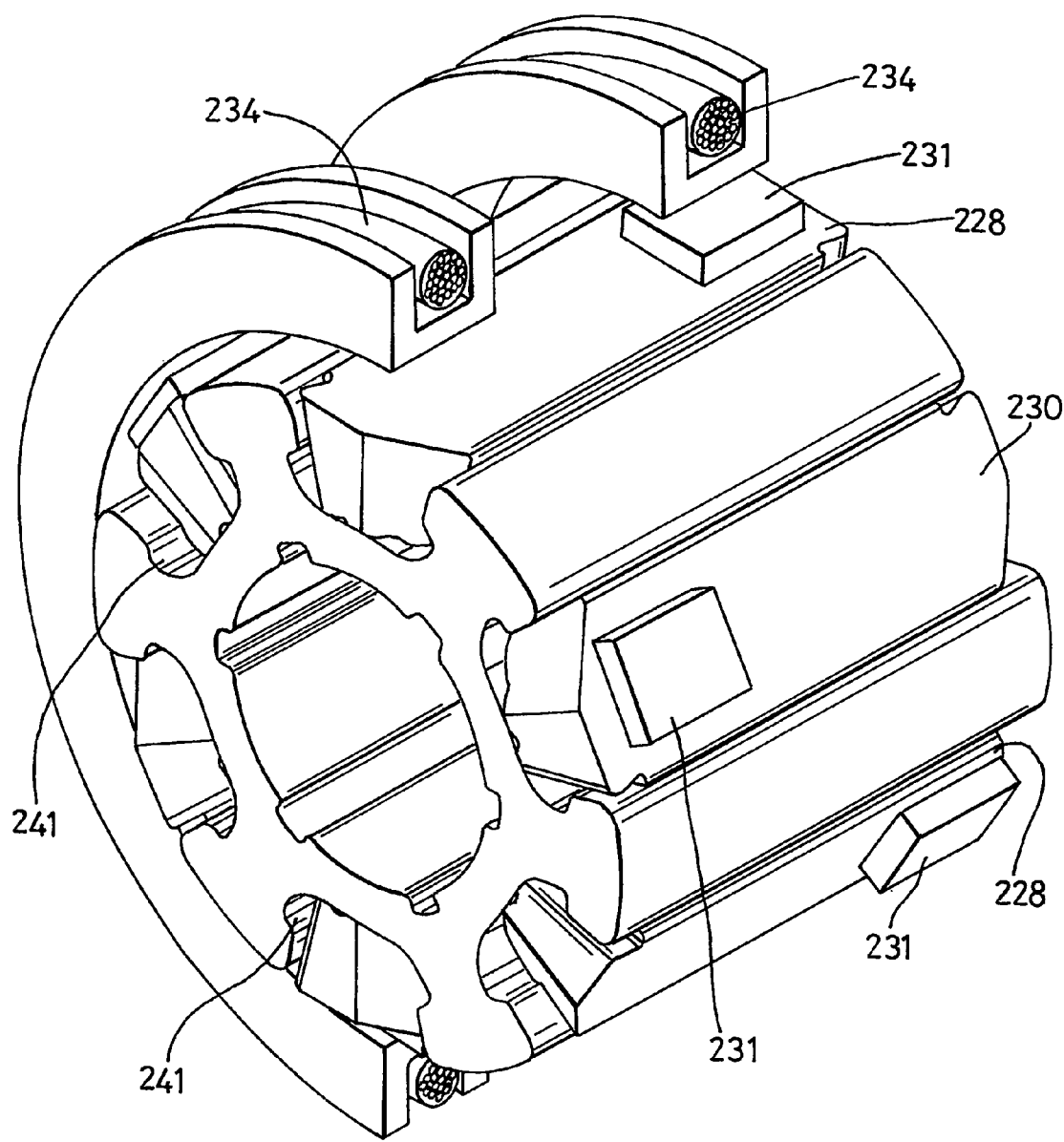
FIG. 8 shows a third embodiment of the invention.

FIG. 8 shows a third embodiment of the invention having two coils 234 and a single magnet 231 located on the upper surface of each engagement bar 228,230 towards one end. In this embodiment the permanent magnets 231 located on the bars of one of the bar sets are positioned adjacent one of the gear wheels and the permanent magnets 231 located on the bars of the other bar set are located adjacent the other gear wheel. With this arrangement, one of the coils 234 will primarily interact with one of the bar sets and the other coil 234 will primarily interact with the other bar set. This ensures that each coil 234 controls the movement of one bar set. Preferably the magnets 231 for a particular bar set are arranged such that their poles are similarly directed, for example the magnets 231 of one bar set can be arranged with their north poles directed towards the adjacent gear wheel and the magnets 231 of the other bar set with their south poles directed towards their adjacent gear wheel. The control circuit is arranged such that the current in the coils 34 is reversible so that each coil 234 can move its associated bar set in both axial directions along keyways 241 thereby moving them into and out of engagement with the first and second gear wheels. To move a bar set into a neutral position its associated coil 234 can be energised to move the bars towards the neutral position, the current can then be reversed in the coil 234 to arrest movement of the bar set in the neutral position.

It will be appreciated that the permanent magnets can be located in different positions on the engagement bars 28,30 and the polarities of the magnets can be oriented appropriately to achieve the desired movement of the bars 28,30 along the output shaft 1 when the coil(s) 34 are energised.

The coils 34 and circuit can be arranged similar to known solenoid type systems, for example those disclosed in U.S. Pat. No. 6,667,677, U.S. Pat. No. 6,498,416, U.S. Pat. No. 6,489,870, U.S. Pat. No. 6,366,189.

Alternatively, or additionally, the engagement bars 28,30 can be permanent magnets.

It will also be appreciated by the skilled person that the detents 36 can be arranged such that the balls 38 and springs 40 can be located in the keyways 41 and the depressions 42*a-c* can be located in the inner side of the engagement members.

The number of dogs on each of the gear wheels is not limited to three, for example any practicable number of dogs can be used. It has been found that two to eight dogs are suitable for most applications. Similarly, the number of bars in a bar set can be any practicable number but most preferably the number of bars in a set equals the number of dogs in a group.

The transmission system can be used in any vehicle for example, road cars, racing cars, lorries, motorcycles, bicycles, earth removal vehicles such as bulldozers, cranes, military vehicles, aircraft such as aeroplanes and helicopters, watercrafts such as boats, ships and hovercraft and other and manufacturing machinery such as lathes and milling machines and assembly equipment.

The transmission system can be adapted such that the selector assembly and the first and second gear wheels are mounted on the input shaft and the fixed gear wheels are mounted on the output shaft.

The electromagnetic coupling device described above can be used with conventional dog transmission systems. At least one coil, and preferably two coils, of copper wire is mounted about a dog. The coil is electrically connected to a circuit that is arranged to selectively energise the or each coil to generate a controllable electromagnetic field. At least one permanent magnet is located on the dog ring the arrangement being such that when the or each coil is energised the magnetic field(s) generated interacts with the magnetic field(s) emitted by the permanent magnet(s) causing the dog ring to selectively move into and out of engagement with the gear wheels, thereby transmitting power between the gear wheels and a shaft.

The coupling arrangement described can be used in applications other than vehicle transmission systems. The coupling device can be used in any suitable machines having first and second rotatable bodies that need to be coupled together to transmit drive between them. For example, it may be used in any machine that has coupling formations to connect first and second rotatable bodies together such as for transferring drive between a shaft and a pulley wheel, a shaft and a roller, a shaft and a machine chuck, a shaft connected to any rotatable load, between two similar components such as two shafts, a shaft and a gear wheel, a drive member to a device such as a pump, and a drive member to a cam shaft or cam. In particular, but not exclusively, the invention can be used in any dog type drive system, for example where two rotatable components are connected by dog type formations associated with each rotatable component, such as two shafts each having dogs formed in their end faces or having coupling components mounted on the shafts, wherein at least one of the shafts is moveable towards the other shaft such that the coupling formations can engage. Alternatively, the coupling formations may be separate components that can selectively move into and out of engagement with one or both of the rotatable bodies. In either case, the electromagnetic actuator system can be used to move the components into driving engagement, thereby coupling them together.

The invention claimed is:

1. A coupling device including:
   first and second rotatable bodies, said first rotatable body including drive formations located thereon;
   first and second sets of engagement members arranged for rotation with the second rotatable body and for selectively engaging the drive formations thereby coupling the first and second rotatable bodies together to transfer drive between the first and second rotatable bodies; and
   an electro-magnetic actuator for controlling engagement of the first and second sets of engagement members with the drive formations;
   wherein the first and second sets of engagement members are moveable into and out of engagement with the drive formations independently of each other, the arrangement being such that when the drive formations are engaged by the first and second sets of engagement members and a braking force is transmitted the first set of engagement members drivingly engages the drive formations, and the second set of engagement members is in an unloaded condition and when a driving force is transmitted the second set of engagement members drivingly engages the drive formations, and the first set of engagement members is then in an unloaded condition.

2. A coupling device according to claim 1, wherein the electro-magnetic actuator includes at least one magnetic field generator for producing a controllable magnetic field and at least one magnetic element.

3. A coupling device according to claim 2, wherein the electro-magnetic actuator includes a plurality of magnetic field generators for producing a plurality of controllable magnetic fields.

4. A coupling device according to claim 2, wherein the electro-magnetic actuator includes a plurality magnetic elements.

5. A coupling device according to claim 2, wherein the electro-magnetic actuator includes an electrical control circuit having at least one capacitor arranged to energise the or each magnetic field generator.

6. A coupling device according to claim 3, wherein the electro-magnetic actuator includes first and second magnetic field generators, wherein each magnetic field generator is arranged to control movement of one of the sets of engagement members.

7. A coupling device according to claim 1, including a for maintaining the first and/or second sets of engagement members in at least one predetermined position.

8. A coupling device according to claim 7, wherein the predetermined position is at least one of a neutral position and in engagement with the first rotatable body.

9. A transmission system including:
   first and second drive shafts;
   first and second gear sets mounted on the shafts for transferring drive between the shafts, each gear set including a first gear wheel mounted on the first shaft for rotation relative to the first shaft, said first gear wheel having a plurality of drive formations, and a second gear wheel mounted on the second shaft for rotation with the second shaft;
   a selector for selectively transferring drive between the first shaft and at least one of the first and second gear sets, said selector device including first and second sets of engagement members that are each moveable into and out of engagement with both the first and second gear sets independently of each other; and
   an electro-magnetic actuator for controlling movement of the first and second sets of engagement members,
   wherein the selector device is arranged such that when the first gear wheel of one of the first and second ear sets is selected by the first and second sets of engagement members and a driving force is transmitted, one of the first and second sets of engagement members drivingly engages the first gear wheel, and the other set of engagement members is then in an unloaded condition.

10. A transmission system according to claim 9, wherein the electro-magnetic actuator includes at least one magnetic field generator for producing a controllable magnetic field and at least one magnetic element.

11. A transmission system according to claim 10, wherein the electro-magnetic actuator includes a plurality of magnetic field generators for producing a plurality of controllable magnetic fields.

12. A transmission system according to claim 11, wherein the electro-magnetic actuator includes a plurality of magnetic elements.

13. A transmission system according to claim 10, wherein the electro-magnetic actuator includes an electrical control circuit having at least one capacitor arranged to energise the or each magnetic field generator.

14. A transmission system according to claim 9, wherein the electro-magnetic actuator is arranged to move at least one of the first and second sets of engagement members axially into engagement with the first gear wheel.

15. A transmission system according to claim 9, including a device for maintaining the first and/or second set of engagement members in at least one predetermined position.

16. A transmission system according to claim 15, wherein the predetermined position is at least one of a neutral position and in engagement with one of the first gear wheels.

17. A transmission system according to claim 11, wherein the electro-magnetic actuator includes first and second magnetic field generators, wherein each magnetic field generator is arranged to control movement of one of the first and second sets of engagement members.

18. A transmission system according to claim 9, wherein the electro-magnetic actuator is arranged to move the unloaded set of engagement members into driving engagement with an unengaged gear wheel to effect a gear change.

19. A transmission system according to claim 9, wherein the selector is arranged such that when a braking force is transmitted the first set of engagement members drivingly engages the first gear wheel, and the second set of engagement members is in an unloaded condition, and when a driving force is transmitted the second set of engagement members drivingly engages the first gear wheel, and the first set of engagement members is then in an unloaded condition.

20. A transmission system according to claim 9, wherein the electro-magnetic actuator is arranged to bias the loaded set of engagement members towards an unengaged gear wheel without disengaging the loaded set of engagement members from the first gear wheel currently.

21. A transmission system according to claim 9, wherein the first and second sets of engagement members are arranged to rotate, in use, with the first shaft.

22. A transmission system including:
first and second drive shafts;
first and second gear sets mounted on the shafts for transferring drive between the shafts, each gear set including a first gear wheel mounted on the first shaft for rotation relative to the first shaft, said first gear wheel having a plurality of drive formations, and a second gear wheel mounted on the second shaft for rotation with the second shaft;
a selector device for selectively transferring drive between the first shaft and at least one of the first and second gear sets, said selector device including first and second sets of engagement members that are moveable into and out of engagement with the first and second gear sets independently of each other; and
an electro-magnetic actuator device for controlling movement of the first and second sets of engagement members;
wherein the selector device is arranged such that when the first gear wheel of one of the first and second gear sets is selected by the first and second sets of engagement members and a braking force is transmitted the first set of engagement members drivingly engages the first gear wheel, and the second set of engagement members is in an unloaded condition, and when a driving force is transmitted the second set of engagement members drivingly engages the first gear wheel, and the first set of engagement members is then in an unloaded condition.

* * * * *